(12) United States Patent
Moteki et al.

(10) Patent No.: US 10,636,165 B2
(45) Date of Patent: Apr. 28, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Atsunori Moteki, Chofu (JP); Nobuyasu Yamaguchi, Kawasaki (JP); Taichi Murase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 268 days.

(21) Appl. No.: 15/903,752

(22) Filed: Feb. 23, 2018

(65) Prior Publication Data
US 2018/0253861 A1 Sep. 6, 2018

(30) Foreign Application Priority Data
Mar. 2, 2017 (JP) .................................. 2017-039450

(51) Int. Cl.
| G06T 7/73 | (2017.01) |
| G06T 19/00 | (2011.01) |
| G06T 7/174 | (2017.01) |
| G06T 7/90 | (2017.01) |

(52) U.S. Cl.
CPC ............... *G06T 7/73* (2017.01); *G06T 7/174* (2017.01); *G06T 7/90* (2017.01); *G06T 19/006* (2013.01)

(58) Field of Classification Search
CPC ......... G06T 7/73; G06T 19/006; G06T 7/174; G06T 7/90; G06T 2207/30164; G06T 7/74
See application file for complete search history.

(56) References Cited

U.S. PATENT DOCUMENTS

| 2008/0172201 A1 | 7/2008 | Kotake et al. |
| 2011/0169861 A1 | 7/2011 | Suzuki et al. |
| 2016/0086322 A1* | 3/2016 | Arita ....................... E01B 35/02 |
| | | 382/154 |

FOREIGN PATENT DOCUMENTS

| JP | 2008-176509 | 7/2008 |
| JP | 2011-8687 | 1/2011 |
| JP | 2011-141828 | 7/2011 |

OTHER PUBLICATIONS

Straub et al., "Fast Relocalization for Visual Odometry Using Binary Features," In Proc. ICIP, 2013, pp. 2548-2552.

* cited by examiner

*Primary Examiner* — Siamak Harandi
(74) *Attorney, Agent, or Firm* — Staas & Halsey LLP

(57) ABSTRACT

An information processing apparatus configured to store a plurality of images captured by an imaging device, store first position information and first orientation information indicating positions and orientations of the imaging device in capturing of each of the plurality of images, identify, among from the plurality of images, a first image resembling a second image, identify a first area included in the first image, identify a second area, included in the second image, corresponding to the first area, identify second position information and second orientation information indicating a position and an orientation of the imaging device respectively in capturing of the second image, based on a comparison between a first luminance of a first pixel included in the first area and a second luminance of a second pixel included in the second area and the first position information and the first orientation information of the first image.

20 Claims, 15 Drawing Sheets

FIG. 4

| MAP POINT NUMBER | THREE-DIMENSIONAL COORDINATES | | | FEATURE |
|---|---|---|---|---|
| | X [mm] | Y [mm] | Z [mm] | |
| 1 | 126 | 59 | 329 | (0.264, ⋯) |
| 2 | 314 | 193 | 289 | (0.822, ⋯) |
| 3 | 212 | 49 | 315 | (0.652, ⋯) |
| ⋯ | ⋯ | ⋯ | ⋯ | ⋯ |
| 68 | -237 | -21 | 291 | (0.740, ⋯) |

FIG. 5

| KEY FRAME NUMBER | POSITION AND ORIENTATION | IMAGE INFORMATION | FEATURE POINT GROUP | CORRESPONDING MAP POINT NUMBER |
|---|---|---|---|---|
| 1 | (0.24, 0.84, 0.96, 245.0, 313.9, 23.8) | (24, 46, ...) | (11, 42), (29, 110), (178, 90), (242, 310), ... | 3, 5, 9, 32, ... |
| 2 | (0.15, 0.90, 0.23, 93.3, 163.0, 73.2) | (25, 44, ...) | (92, 32), (41, 88), (201, 11), (232, 290), ... | 2, 11, 43, 51, ... |
| 3 | (0.64, 0.45, 0.12, 132.8, 77.3, 61.8) | (22, 40, ...) | (13, 27), (32, 38), (42, 103), (83, 55), ... | 4, 7, 28, 37, ... |
| ... | ... | ... | ... | ... |
| 25 | (0.54, 0.80, 0.92, 398.2, 310.2, 292.0) | (134, 89, ...) | (55, 120), (173, 193), (103, 167), (238, 262), ... | 32, 35, 58, 62, ... |

112

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-39450, filed on Mar. 2, 2017, the entire contents of which are incorporated herein by reference.

FIELD

The embodiments discussed herein are related to an information processing apparatus, a method and a non-transitory computer-readable storage medium.

BACKGROUND

An augmented reality (AR) technology is known in which a virtual image is displayed to be overlaid at a certain position in an image in real space. Such an AR technology is becoming widely used in applications, one of which is, for example, to support working of a worker in workspace, such as a factory, by displaying work support information indicating the work content, a working object location, and the like to be overlaid on a captured image.

In the AR technology, a technique to estimate the position and orientation of a camera in real space is used in order to overlay a virtual image at a suitable position on a captured image. In addition, in a situation where the user is working, the position and orientation of a camera frequently changes. Therefore, the position and orientation estimation is prone to temporary failure. From this, a return processing technique by which, from a state where the position and orientation estimation has failed, the estimation is resumed is desirable.

As an example of return processing methods, a method has been proposed in which feature points in the current image and feature points in a key frame are correspondingly related to each other and, based on coordinate information of a three-dimensional map for the correspondingly related features in the key frame, the position and orientation of a camera at the time of capturing the current image is estimated.

In addition, a position and orientation measurement apparatus as described below that inhibits calculation of the position and the orientation from collapsing has been proposed. The position and orientation measurement apparatus generates a plurality of positions and orientations based on a plurality of positions and orientations obtained from the previous frames, determines the position and orientation of a camera by performing a non-linearity optimization of each of the plurality of positions and orientations, and selects the most suitable position and orientation from among the determined positions and orientations. As related art documents, Japanese Laid-open Patent Publication No. 2008-176509 and J. Straub et al., "Fast relocalization for visual odometry using binary features," In Proc. ICIP, pp. 2548-2552, 2013 are disclosed.

SUMMARY

According to an aspect of the invention, an information processing apparatus including a memory configured to store a plurality of images captured by an imaging device, store first position information indicating positions of the imaging device in capturing of each of the plurality of images, and store first orientation information indicating orientations of the imaging device in capturing of each of the plurality of images, and a processor coupled to the memory and configured to identify, among from the plurality of images, a first image resembling a second image captured by the imaging device, identify a first area included in the first image, identify a second area, included in the second image, corresponding to the first area, identify second position information and second orientation information indicating a position and an orientation of the imaging device respectively in capturing of the second image, based on a comparison between a first luminance of a first pixel included in the first area and a second luminance of a second pixel included in the second area and the first position information and the first orientation information of the first image, and output the identified second position information and the second orientation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a data configuration example of a three-dimensional map;

FIG. 5 is a diagram illustrating a data configuration example of a key frame information table;

DESCRIPTION OF EMBODIMENTS

In the position and orientation estimation processing used in the foregoing return processing method, the corresponding relationships of feature points are identified between the current image and the key frame. However, in this processing, for example, in the case where multiple similar image patterns appear in an image when an object is imaged, the corresponding relationships of feature points are likely to have errors. Therefore, a problem arises in that the accuracy of position and orientation estimation decreases.

Hereinafter, embodiments of the present disclosure will be described with reference to the drawings.

First Embodiment

Figure 1:
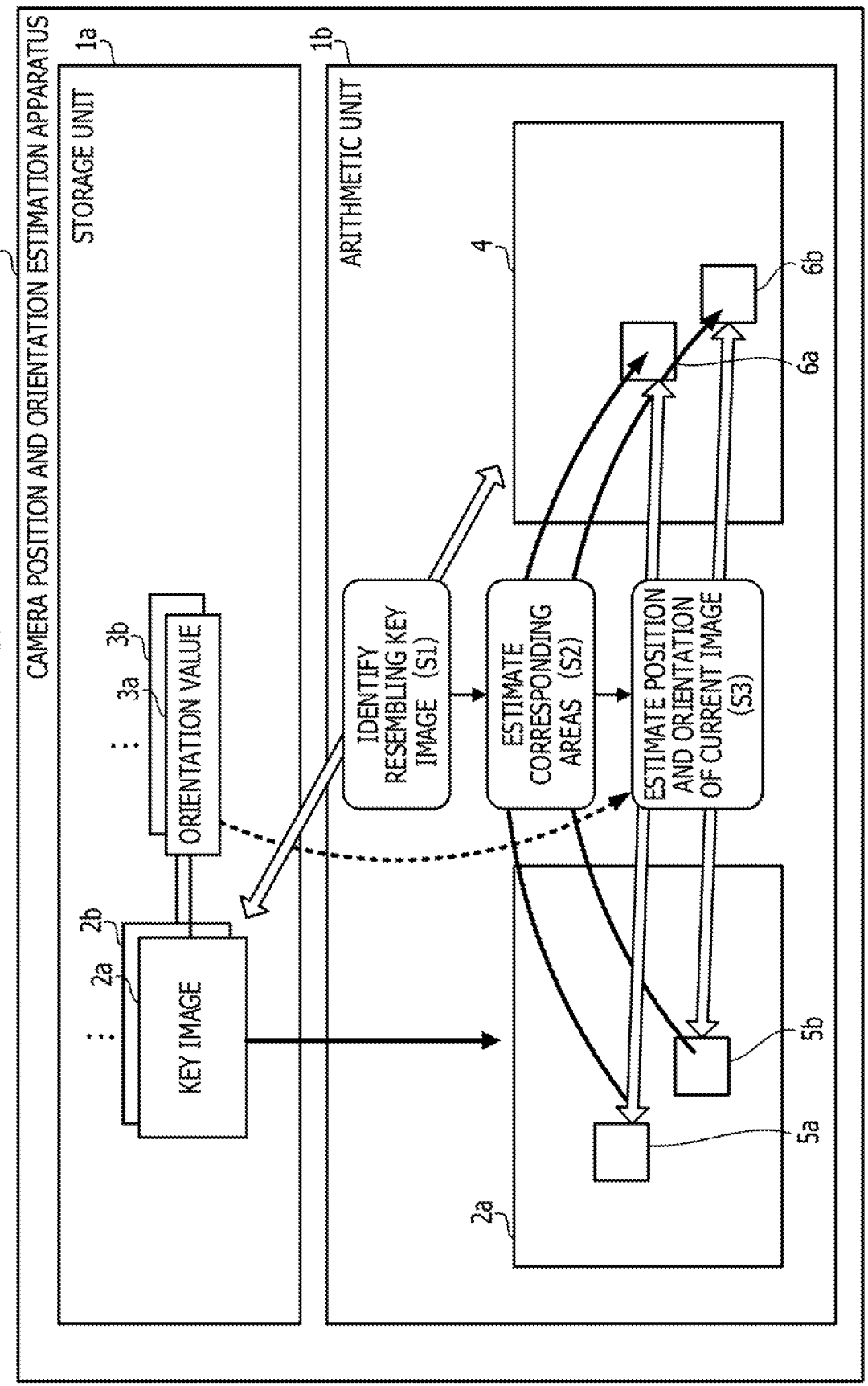
FIG. 1 is a diagram illustrating a configuration example and a processing example of a camera position and orientation estimation apparatus according to a first embodiment.

FIG. 1 is a diagram illustrating a configuration example and a processing example of a camera position and orientation estimation apparatus according to a first embodiment. A camera position and orientation estimation apparatus 1 illustrated in FIG. 1 includes a storage unit 1a and an arithmetic unit 1b. The storage unit 1a is implemented, for example, as a storage area of a storage apparatus (not illustrated) included in the camera position and orientation estimation apparatus 1. The arithmetic unit 1b is implemented, for example, as a processor (not illustrated) included in the camera position and orientation estimation apparatus 1.

The storage unit 1a stores therein key images (first images) 2a, 2b, . . . . The key images 2a, 2b, . . . are images in each of which the position and orientation of a camera, which is not illustrated, at the time when the key image is captured by the camera is correctly estimated. In the storage unit 1a, orientation values 3a, 3b, . . . respectively representing the positions and orientations estimated for the key images 2a, 2b, . . . are also stored.

The arithmetic unit 1b identifies a key image (third image) resembling a current image (second image) 4 out of the key images 2a, 2b, . . . (step S1). The current image 4 is an image that has been captured by a camera and for which the position and orientation of the camera at the time of capture thereof is to be estimated. In the example in FIG. 1, the key image 2a is assumed to be identified as the resembling key image.

Next, the arithmetic unit 1b identifies an area (first area) including a plurality of pixels from the identified key image 2a. In the example in FIG. 1, areas 5a and 5b are identified as such areas. In addition, the arithmetic unit 1b estimates areas (second areas) 6a and 6b respectively corresponding to the identified areas 5a and 5b, from the current image 4 (step S2).

Next, based on a comparison result of pixel values between the areas 5a and 5b and the areas 6a and 6b and the orientation value 3a for the key image 2a, the arithmetic unit 1b estimates the position and orientation of the camera at the time of capture of the current image 4 (step S3).

With the camera position and orientation estimation apparatus 1 in such a manner, the position and orientation for the current image 4 is estimated based on a comparison result of pixel values between the areas 5a and 5b and the areas 6a and 6b, each of which has a plurality of pixels. Thus, for example, compared with the case where the position and orientation is estimated based on the correspondence relationships of local feature points between the key image 2a and the current image 4, the position and orientation is able to be estimated based on the corresponding relationships of more global image areas. Therefore, in the case where multiple similar image patterns are contained in an image, the occurrence possibility of a situation where the positions corresponding between images are estimated incorrectly and the incorrectness leads to a decrease in accuracy of position and orientation estimation may be reduced. Accordingly, the accuracy of position and orientation estimation may be improved.

Second Embodiment

Next, an example of a terminal apparatus that makes use of the position and orientation estimation processing included in the camera position and orientation estimation apparatus 1 in FIG. 1 for return processing in which estimation is resumed from a state where position and orientation estimation processing has failed.

Figure 2:
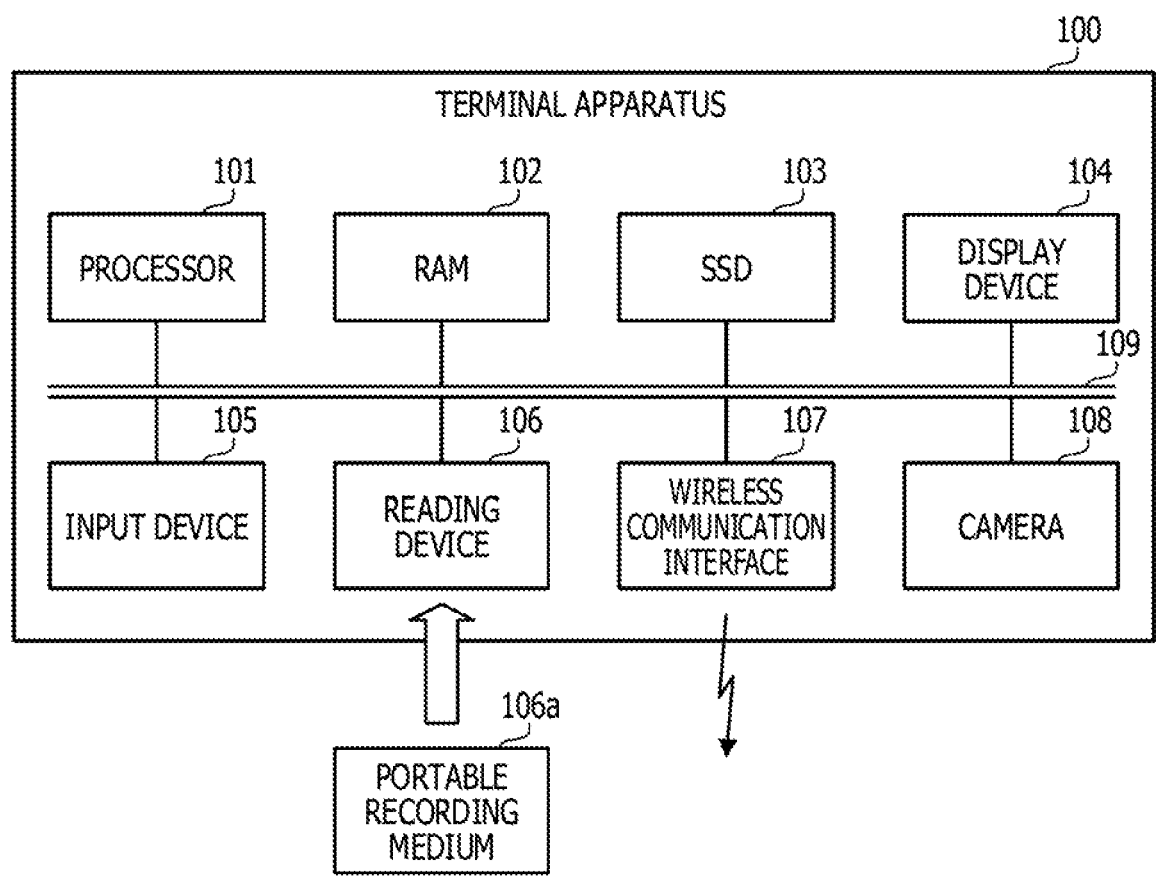
FIG. 2 is a diagram illustrating a hardware configuration diagram of a terminal apparatus according to a second embodiment.

FIG. 2 is a diagram illustrating an example of a hardware configuration of a terminal apparatus according to a second embodiment. A terminal apparatus 100 according to the second embodiment has functions of capturing an image and estimating the position and orientation of the camera at this point, and displaying a virtual image to be overlaid on the captured image by using information on the estimated position and orientation. The terminal apparatus 100 is implemented, for example, as a portable computer as illustrated in FIG. 2.

The entire terminal apparatus 100 illustrated in FIG. 2 is controlled by a processor 101. The processor 101 may be a multi-processor. The processor 101 is, for example, a central processing unit (CPU), a micro processing unit (MPU), a digital signal processor (DSP), an application specific integrated circuit (ASIC), or a programmable logic device (PLD). In addition, the processor 101 may be a combination of two or more components among the CPU, MPU, DSP, ASIC, and PLD.

A random access memory (RAM) 102 and a plurality of peripheral devices are coupled via a bus 109 to the processor 101.

The RAM 102 is used as a main storage device of the terminal apparatus 100. In the RAM 102, at least some of an operating system (OS) program and application programs, which are executed by the processor 101, are temporarily stored. In addition, various types of data to be used for processing performed by the processor 101 are stored in the RAM 102.

The peripheral devices coupled to the bus 109 include a solid state drive (SSD) 103, a display device 104, an input device 105, a reading device 106, a wireless communication interface 107, and a camera 108.

The SSD 103 is used as an auxiliary storage device of the terminal apparatus 100. In the SSD 103, an OS program, application programs, and various types of data are stored. Note that, as auxiliary storage devices, other types of nonvolatile storage devices such as a hard disk drive (HDD) may be used.

The display device 104 displays an image on a screen thereof in accordance with a command from the processor 101. The display apparatus 104 is a liquid crystal display, an electroluminescence (EL) display, or the like.

The input device 105 transmits signals in accordance with an input operation of the user to the processor 101. Examples of the input device 105 include a touch panel arranged on the display surface of the display device 104, a touch pad, a mouse, a track ball, and operation keys.

A portable recording medium 106a is attached to and removed from the reading device 106. The reading device 106 reads data recorded on the portable recording medium 106a and transmits the read data to the processor 101. The portable recording medium 106a is an optical disk, a magneto-optical disk, semiconductor memory, or the like.

The wireless communication interface 107 transmits and receives data to and from other devices via wireless communication.

The camera 108 digitizes image signals obtained by an imaging device and transmits the obtained image signals to the processor 101.

With a hardware configuration as described above, processing functions of the terminal apparatus 100 may be implemented.

Processing Functions of Terminal Apparatus

Figure 3:
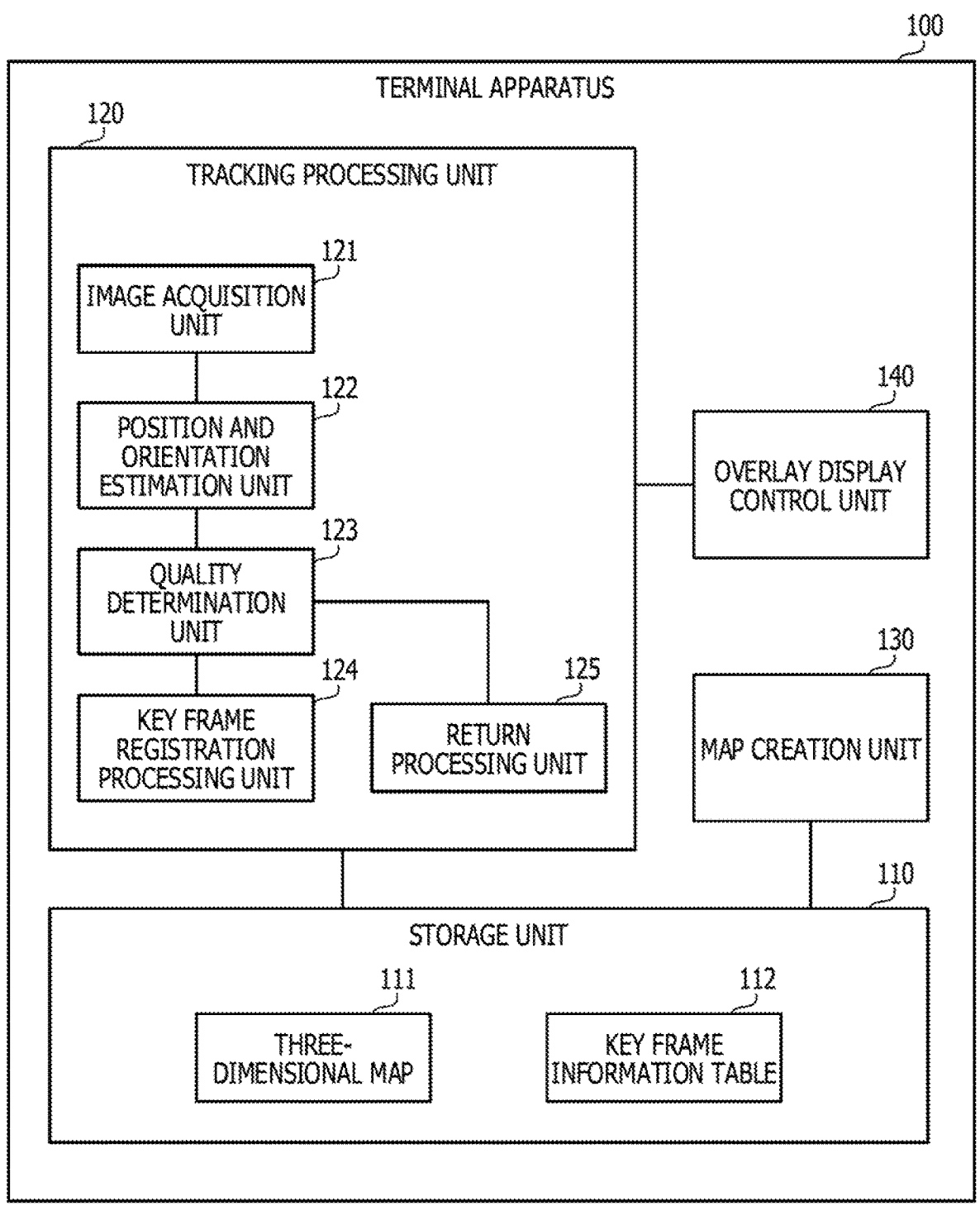
FIG. 3 is a block diagram illustrating a configuration example of processing functions of a terminal apparatus.

FIG. 3 is a block diagram illustrating an example of a configuration of processing functions of a terminal apparatus. The terminal apparatus 100 includes a storage unit 110, a tracking processing unit 120, a map creation unit 130, and an overlay display control unit 140. The storage unit 110 is implemented as a storage area for storage devices (for example, the RAM 102, the SSD 103, and the like) included in the terminal apparatus 100. The processing of the tracking processing unit 120, the map creation unit 130, and the overlay display control unit 140 is implemented, for example, by the processor 101 executing predetermined programs.

A three-dimensional map 111 and a key frame information table 112 are stored in the storage unit 110. Three-dimensional coordinates of feature points on an object are stored in the three-dimensional map 111. Key frame information for key frames is stored in the key frame information table 112.

Here, FIG. 4 is a diagram illustrating an example of a data configuration of a three-dimensional map. A map point number, three-dimensional coordinates, and a feature are stored in each record of the three-dimensional map 111. The map point number represents the identification number of a feature point (map point) on an object. The three-dimensional coordinates respectively represent the coordinates on the X-axis, Y-axis, and Z-axis of a map point in the global coordinate system. Each coordinate is expressed, for example, in millimeter (mm). A feature is information indicating the feature of a map point. As features, for example, scale-invariant feature transform (SIFT), speeded up robust features (SURF), oriented FAST (features from accelerated segment test) and rotated BRIEF (binary robust independent elementary features) (ORB), and the like are used.

The three-dimensional map 111 is referenced when the position and orientation of the camera 108 is estimated by the tracking processing unit 120, as described below. In addition, a record for a feature newly extracted from a captured image for which the position and orientation has been correctly estimated is added to the three-dimensional map 111 by the map creation unit 130.

FIG. 5 is a diagram illustrating an example of a data configuration of a key frame information table. The key frame is an image selected based on predetermined conditions from captured images for which the positions and orientations have been correctly estimated. Key frame information, which corresponds to information included in one record of the key frame information table 112, includes Key frame number, Position and orientation, Image information, Feature point group, and Corresponding map point number.

Key frame number represents the identification number of a key frame. Position and orientation represents the position and orientation of a camera at the time of capture of a key frame. Position and orientation is represented as six-dimensional information, $(r_1, r_2, r_3, t_1, t_2, t_3)$. In this information, $(r_1, r_2, r_3)$ represents the orientation (rotational component) of the camera 108 in global coordinates and $(t_1, t_2, t_3)$ represents the position (translational component) of the camera 108 in global coordinates.

Image information indicates the pixel value of each pixel of a key frame. In the present embodiment, Image information is assumed to represent the luminance of each pixel. Feature point group represents the coordinates on a key frame of each of individual feature points that are extracted from the key frame and are correspondingly related to map points in the three-dimensional map 111. Corresponding map point number represents the map point numbers of map points respectively corresponding to feature points.

With reference to FIG. 3, description will be continued below.

Each time the tracking processing unit 120 acquires a captured image from the camera 108, the tracking processing unit 120 estimates the position and orientation of the camera 108 at the time when the image was captured. In addition, the tracking processing unit 120 selects a key frame out of captured images for which the positions and orientations have been correctly estimated, and registers key frame information about the key frame in the key frame table 112.

The map creation unit 130 registers the three-dimensional coordinates and features of map points in the three-dimensional map 111, based on key frame information registered in the key frame information table 112. For example, the map creation unit 130 selects a pair of key frames including new extracted features and, by using the two-dimensional coordinates of a predetermined number or more of feature points that correspond between the key frames, and calculates the three-dimensional coordinates of each feature point according to the principles of triangulation. As a method for calculating three-dimensional coordinates according to the principles of triangulation, for example, a method described in non-patent literature, R. I. Hartley et al., "Triangulation," Computer Vision and Image Understanding, Vol. 68, No. 2, pp. 146-157, 1997, may be used.

The overlay display control unit 140 displays predetermined work support information to be overlaid on a captured image, based on the three-dimensional map 111 and the position and orientation estimated by the tracking processing unit 120. For example, the overlay display control unit 140 recognizes a marker from a captured image and identifies a work stage from a recognition result of the internal pattern of the marker. The overlay display control unit 140 reads work support information corresponding to the identified work stage from among work support information (not illustrated) stored to be correspondingly related to each work stage, and displays the read work support information to be overlaid at a suitable position on the captured image. The overlay display control unit 140 adjusts the display state (for example, rotation angle) of the work support information based on the position and orientation estimated for the captured image.

Next, the internal configuration of the tracking processing unit 120 will be described. The tracking processing unit 120 includes an image acquisition unit 121, a position and orientation estimation unit 122, a quality determination unit 123, a key frame registration processing unit 124, and a return processing unit 125.

The image acquisition unit 121 acquires captured images captured by the camera 108 at regular intervals and supplies the captured images to the position and orientation estimation unit 122. Note that a captured image acquired by the image acquisition unit 121, that is, a captured image for which the position and orientation is to be estimated is hereinafter described as "current image" in some cases.

The position and orientation estimation unit 122 estimates the position and orientation of the camera 108 at the time of capture, in a way as follows.

The position and orientation estimation unit 122 first extracts feature points from the current image. Next, the position and orientation estimation unit 122 identifies, as a neighborhood key frame, a key frame resembling the current image out of key frames registered in the key frame information table 112. For example, the position and orientation estimation unit 122 scales down the current image and each of key frames registered in the key frame information table 112 to a predetermined size and further blurs the scaled-down current image and key frames with a Gaussian filter. Then, the position and orientation estimation unit 122 calculates the sum of squared distance (SSD) of a luminance between the current image and each of the key frames and identifies a key frame with the smallest SSD as a neighborhood key frame.

Next, the position and orientation estimation unit 122 acquires two-dimensional coordinates of map points (feature points) included in the neighborhood key frame from key frame information on the neighborhood key frame. The position and orientation estimation unit 122 identifies map points in the neighborhood key frame respectively corresponding to the feature points extracted from the current image and extracts a plurality of pairs of feature points and map points. Note that the map points corresponding to the feature points are identified based on the degree of similarity of the feature of each point.

Next, by using four or more pairs of feature points and map points, the position and orientation estimation unit 122 estimates the position and orientation of the camera 108 at the time of capture of the current image by a PnP algorithm. As a method for estimating the position and orientation according to the PnP algorithm, for example, a method described in non-patent literature, V. Lepetit et al., EPnP: "An Accurate O(n) Solution to the PnP Problem," International Journal of Computer Vision, Vol. 81, No. 2, pp. 155-166 (2008) may be used.

Note that the absolute position and orientation of the camera 108 is hereinafter described as "absolute position and orientation" in some cases in order to distinguish the absolute position and orientation from "relative position and orientation" described below.

The quality determination unit 123 determines the estimated quality of an absolute position and orientation estimated by the position and orientation estimation unit 122. For example, the total number of features extracted from the current image by the position and orientation estimation unit 122 is denoted as F1, and the number of features correspondingly related to map points in a neighborhood key frame by the position and orientation estimation unit 122, among these features, is denoted as F2. The quality determination unit 123 determines that the estimation quality is high if F2/F1 is greater than or equal to a predetermined threshold (for example, 0.3) and determines that the estimation quality is low if F2/F1 is less than the threshold.

Here, if it is determined that the estimation quality is high, the position and orientation estimation will end in success, in which case the processing of the key frame registration processing unit 124 will be performed, and then the processing of the position and orientation estimation unit 122 will be performed by using a captured image next acquired by the image acquisition unit 121. Otherwise, if it is determined that the estimation quality is low, the position and orientation estimation will end in failure, in which case return processing will be performed by the return processing unit 125.

In accordance with registration conditions of key frame information, the key frame registration processing unit 124 determines whether to register the current image as a key frame. When, for example, the number of frames from a captured image registered as the previous key frame to the current image has reached a predetermined value (for example, 20 frames), the key frame registration processing unit 124 determines that the current image is to be registered as a key frame. In this case, the key frame registration processing unit 124 registers key frame information for the current image in the key frame information table 112.

From a state where the position and orientation estimation has ended in failure, the return processing unit 125 performs return processing in which estimation of an absolute position and orientation is resumed. Here, comparative examples of return processing will be described first and then return processing in the present embodiment will be described.

Comparative Examples of Return Processing

First, a method in which a three-dimensional map and key frame information, as in the present embodiment, are used will be described as a first comparative example of return processing. In this method, features in the current image and map points in a key frame are correspondingly related to each other, and, based on coordinate information of a three-dimensional map for map points in the related key frame, the absolute position and orientation is estimated from the corresponding relationship between the feature points and the map points.

In this method, for all of the combinations of feature points in the current image and map points in the key frame, the feature of the feature point and the feature of the map point are compared. However, since local comparison is performed between the current image and the key frame, an error is likely to occur when feature points and map points are correspondingly related in the case where multiple similar image patterns appear in a captured image. As a result, a problem arises in that the accuracy of absolute position and orientation estimation decreases.

Figure 6:
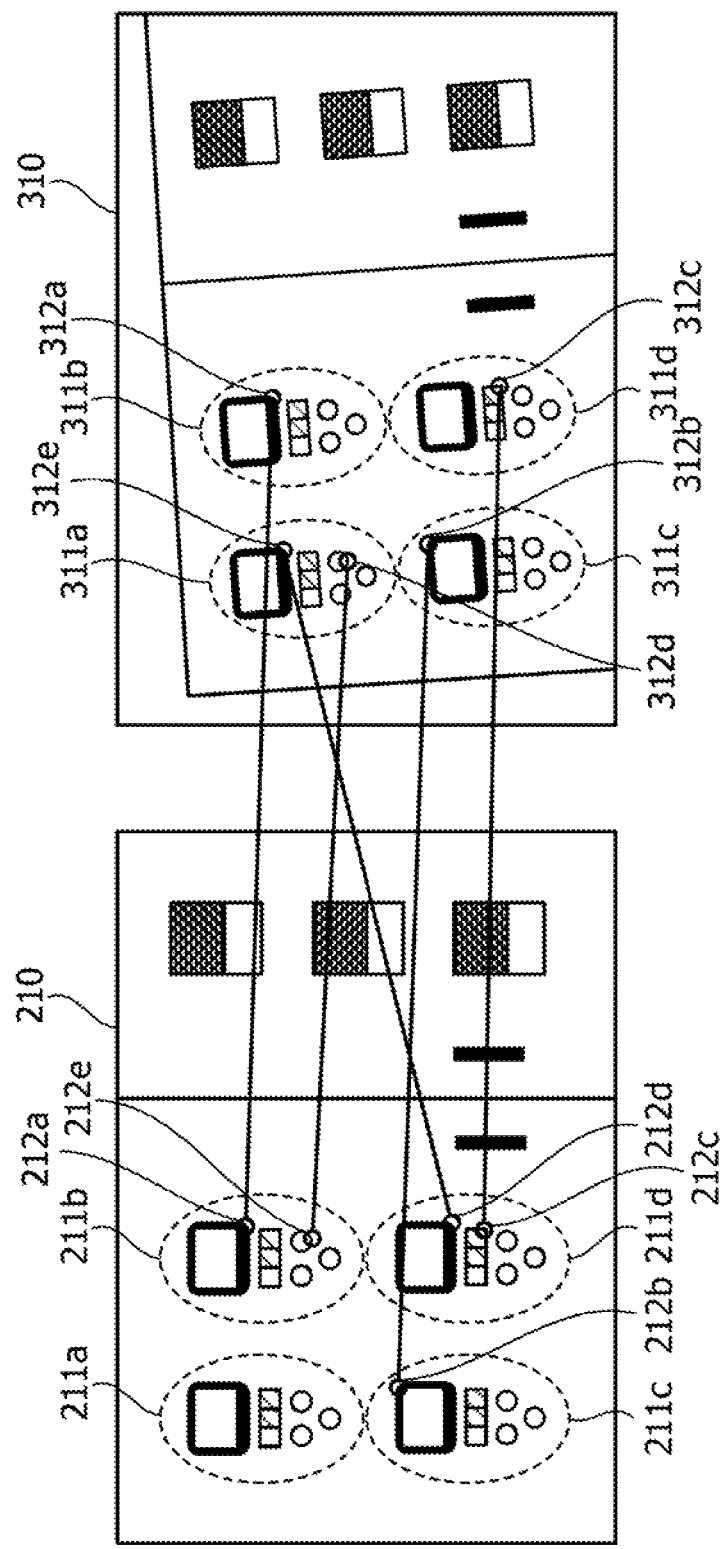
FIG. 6 is a diagram illustrating an example of correspondingly relating feature points and map points when similar image patterns appear in a captured image.

FIG. 6 is a diagram illustrating an example of correspondingly relating feature points and map points in the case where similar image patterns appear in a captured image. In FIG. 6, image patterns 211a to 211d similar to each other are contained in the key frame 210. On the other hand, image patterns 311a to 311d similar to each other are contained in the current image 310. Further, the image patterns 311a, 311b, 311c, and 311d are areas obtained by capturing the same object areas as those of the image patterns 211a, 211b, 211c, and 211d in the key frame 210, respectively.

In addition, the key frame 210 is assumed to include map points 212a to 212e. On the other hand, feature points 312a to 312e are assumed to be extracted from the current image 310. In the processing using the first comparative example described above, it is determined, by using matching of features, which of the map points 212a to 212e the feature points 312a to 312e respectively correspond to.

In the example of FIG. 6, it is assumed that the determination result is such that the feature points 312a, 312b, and 312c respectively correspond to the map points 212a, 212b, and 212c. These points are correctly related. In contrast, it is assumed that the determination result is such that the feature points 312d and 312e respectively correspond to the map points 212e and 212d. These points are incorrectly related.

Since, in such a manner, in a situation where multiple similar image patters appear, a plurality of feature points and a plurality of map points having similar features are present in each image, only the use of local feature matching allows an error to be likely to occur in the corresponding relationship between the feature points and the map points. If the corresponding relationship between feature points and map points has an error, this leads to a decrease in accuracy of estimation of an absolute position and orientation, which is estimated based on the corresponding relationship.

As a second comparative example of return processing, a method as described below is conceivable in which matching between feature points and map points is not performed. In this method, a neighborhood key frame is identified by a comparison between a scaled-down image of the current image and a scaled-down image of each key frame, and a relative position and orientation between the current image and the neighborhood key frame is calculated. Then, an absolute position and orientation is estimated based on the relative position and orientation.

With this method, relative position and orientation estimation is less likely to experience a decrease in accuracy due to the appearance of multiple similar image patterns. However, since scaled-down images are compared, the accuracy of relative position and orientation calculation is low, and, as a result, a problem arises in that the accuracy of absolute position and orientation estimation is low.

In addition, a method of combining the first comparative example and the second comparative example is conceivable. For example, a method of imposing restrictions on correspondence processing between feature points and map points in the first comparative example by using a calculation result of a relative position and orientation calculated in the second comparative example is conceivable. This method inhibits correspondence between features and map points that is evidently incorrect from a calculation result of a relative position and orientation, thereby improving the accuracy in the correspondence processing. However, the accuracy of relative position and orientation calculation is low and therefore when similar image patterns are present at close positions, an error is likely to occur in the correspondence between feature points and map points.

As another method, a method in which feature point tracking using an optical flow is applied to the current image and a key frame to impose restrictions to the correspondence between feature points and map points in the first comparative example is conceivable. However, there is a problem in that the use of an optical flow decreases the accuracy of position and orientation estimation when a movement (for example, rotational movement) of the camera 108 other than translation occurs. Furthermore, there is another problem in that both the optical flow and the feature matching are performed, increasing the processing load.

Return Processing Procedure in Second Embodiment

In the present embodiment, when calculating a relative position and orientation between the current image and the neighborhood key frame, the return processing unit 125 does not compare local features but compares pixel values between the peripheral area of a feature point and the peripheral area of a map point. This minimizes a decrease in accuracy of relative position and orientation calculation performed when multiple similar image patterns appear, resulting in improvement in accuracy of absolute position and orientation calculation.

Figure 7:
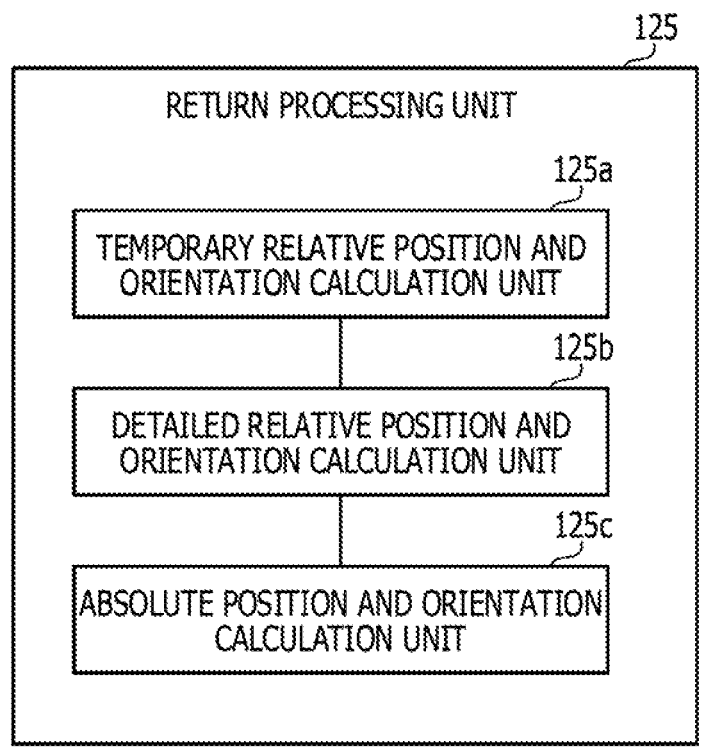
FIG. 7 is a diagram illustrating an example of an internal configuration of a return processing unit.

FIG. 7 is a diagram illustrating an example of an internal configuration of a return processing unit. The return processing unit 125 includes a temporary relative position and orientation calculation unit 125a, a detailed relative position and orientation calculation unit 125b, and an absolute position and orientation calculation unit 125c.

The temporary relative position and orientation calculation unit 125a scales down the current image and the neighborhood key frame to create scaled-down images having the same predetermined size. Note that when an image to be subjected to processing of the return processing unit 125 is an image captured certainly after an image to be subjected to processing of the position and orientation estimation unit 122 has been captured, the temporary relative position and orientation calculation unit 125a identifies a neighborhood key frame out of key frames according to a procedure similar to that of the position and orientation estimation unit 122.

Next, the temporary relative position and orientation calculation unit 125a matches the scaled-down image of the current image and the scaled-down image of the neighborhood key frame to calculate a relative position and orientation between the current image and the neighborhood key frame. The relative position and orientation represents a relative position and orientation of the camera 108 at each of the time of capturing the current image and the time of capturing the neighborhood key frame. The relationship among the absolute position and orientation $\xi_n$ at the time of capturing the current image, the absolute position and orientation $\xi_1$ at the time of capturing a neighborhood key frame, and the relative position and orientation $\xi_r$ is represented by the following equation (1).

$$\xi_n = \xi_r \cdot \xi_1 \qquad (1)$$

The relative position and orientation calculated by the temporary relative position and orientation calculation unit 125a is a rough calculated value calculated from each of scaled-down images of the current image and the neighborhood key frame, and is used as the initial value of processing in the detailed relative position and orientation calculation unit 125b. Accordingly, here, the relative position and orientation calculated by the temporary relative position and orientation calculation unit 125a is called "temporary relative position and orientation" and denoted as $\xi_{r0}$.

More particularly, a temporary relative position and orientation is calculated, for example, by a procedure as follows. The temporary relative position and orientation calculation unit 125a scales down the current image and the neighborhood key frame to create scaled-down images each composed of, for example, 40 pixels×40 pixels. Further, the temporary relative position and orientation calculation unit 125a blurs each scaled-down image with a Gaussian filter. Each scaled-down image generated in such a way is called a small blurred image (SBI).

Next, the temporary relative position and orientation calculation unit 125a calculates a homography matrix H between SBIs based on the correspondence relationship between feature points included in the SBI of the current image and the map points included in the SBI of the neighborhood key frame. The homography matrix is a matrix with three rows and three columns for transforming the coordinates of a point of the SBI of the neighborhood key frame into the coordinates of a point of the SBI of the current image. As a method of calculating the homography matrix H, for example, a method described in non-patent literature, S. Benhimane and E. Malis, "Nomography-based Visual Tracking and Servoing," The International Journal of Robotics and Research, 26 (7): 661-676, 2007 may be used.

Note that an image to be subjected to processing of the return processing unit 125 is the same as that to be subjected to processing of the position and orientation estimation unit 122, the correspondence relationship between feature points and map points has been obtained by the processing of the position and orientation estimation unit 122. Therefore, the temporary relative position and orientation calculation unit 125a is able to calculate the homography matrix H based on the obtained correspondence relationship.

Next, the temporary relative position and orientation calculation unit 125a selects two virtual points $vp_1$ and $vp_2$ from the SBI of the neighborhood key frame. Then, assuming that the rotation component of the temporary position and orientation $\xi_{r0}$ is expressed in matrix form as R, the temporary relative position and orientation calculation unit 125a determines R that satisfies the following equation (2).

$$R = \underset{R}{\operatorname{argmin}} \sum_n |Hvp_n - ARA^{-1}vp_n| \quad (2)$$

In equation (2), A is intrinsic parameters of the camera 108 and is assumed to be determined in advance by calibration. According to equation (2), the rotation component R is determined with which the distance between a point obtained by performing projection transformation of a virtual point by using the homography matrix H and a point obtained by performing coordinate transformation of the virtual point by using the rotation component R and the translational component 0 is smallest.

The temporary relative position and orientation calculation unit 125a outputs the temporary relative position and orientation $\xi_{r0}$ based on the rotation component R obtained by the above procedure. The temporary relative position and orientation $\xi_{r0}$ is calculated as a six-dimensional real number value in which, among the matrix of the determined rotation component R, three predetermined elements are rotation components and the translational component is 0.

The detailed relative position and orientation calculation unit 125b calculates a detailed relative position and orientation $\xi_{r1}$ by using the calculated temporary relative position and orientation $\xi_{r0}$ as the initial value of iterative calculation. The processing of this iterative calculation includes processing in which when the position of a map point in the neighborhood key frame is moved based on the relative position and orientation, the movement destination in the current image is calculated, and processing in which areas of interest respectively corresponding to a feature point and the movement destination are identified.

Figure 8:
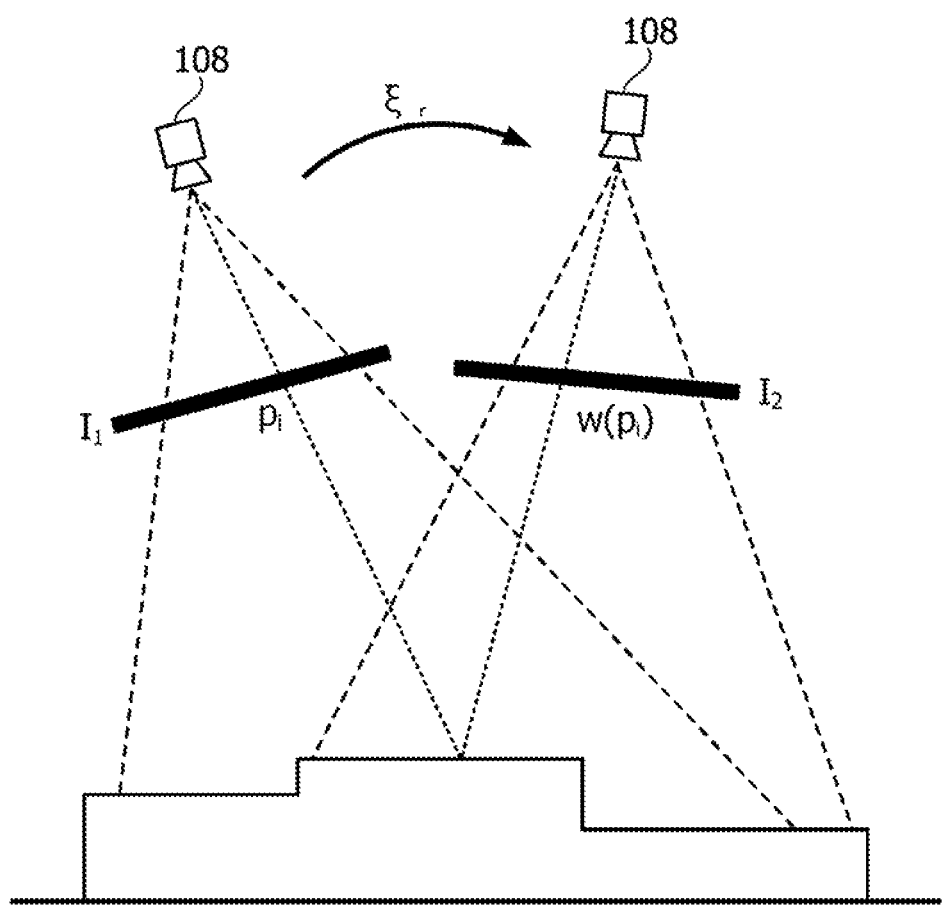
FIG. 8 is a first diagram for explaining processing of calculating a detailed relative position and orientation.

FIG. 8 is a first diagram for explaining processing of calculating a detailed relative position and orientation. An i-th map point in a neighborhood key frame $I_1$ is denoted as $p_i$. At this point, the detailed relative position and orientation calculation unit 125b calculates coordinates w of a movement destination w ($p_i$) in the current image $I_2$ when the position of the map point $p_i$ is moved based on a relative position and orientation $\xi_r$. The coordinates w of the movement destination w ($p_i$) is, for example, calculated as follows.

The intrinsic parameters A of the camera 108 is expressed as in equation (3) given below. At this point, the detailed relative position and orientation calculation unit 125b calculates three-dimensional coordinates ($X_i$, $Y_i$, $Z_i$) in the global coordinate system of the map point $p_i=(u_i, v_i)$ according to equation (4) given below.

$$A = \begin{pmatrix} f_x & 0 & c_x \\ 0 & f_y & c_y \\ 0 & 0 & 1 \end{pmatrix} \quad (3)$$

$$\begin{pmatrix} X_i \\ Y_i \\ Z_i \end{pmatrix} = \begin{pmatrix} \frac{u_i - c_x}{f_x} d_i \\ \frac{v_i - c_y}{f_y} d_i \\ d_i \end{pmatrix} \quad (4)$$

In addition, the detailed relative position and orientation calculation unit 125b divides the relative position and orientation $\xi_r$ into the rotation component R and the translational component t by Rodrigues transformation. The rotation component R is a matrix with three rows and three columns and the translational component t is a matrix with three rows and one column. The detailed relative position and orientation calculation unit 125b then calculates the coordinates of the movement destination w ($p_i$) according to the following equation (5). Note that, in equation (5), (R|t) denotes a matrix with three rows and four columns in which R with three rows and three columns and t with three rows and one column are combined together.

$$w = A(R|t) \begin{pmatrix} X_i \\ Y_i \\ Z_i \\ 1 \end{pmatrix} \quad (5)$$

Figure 9:
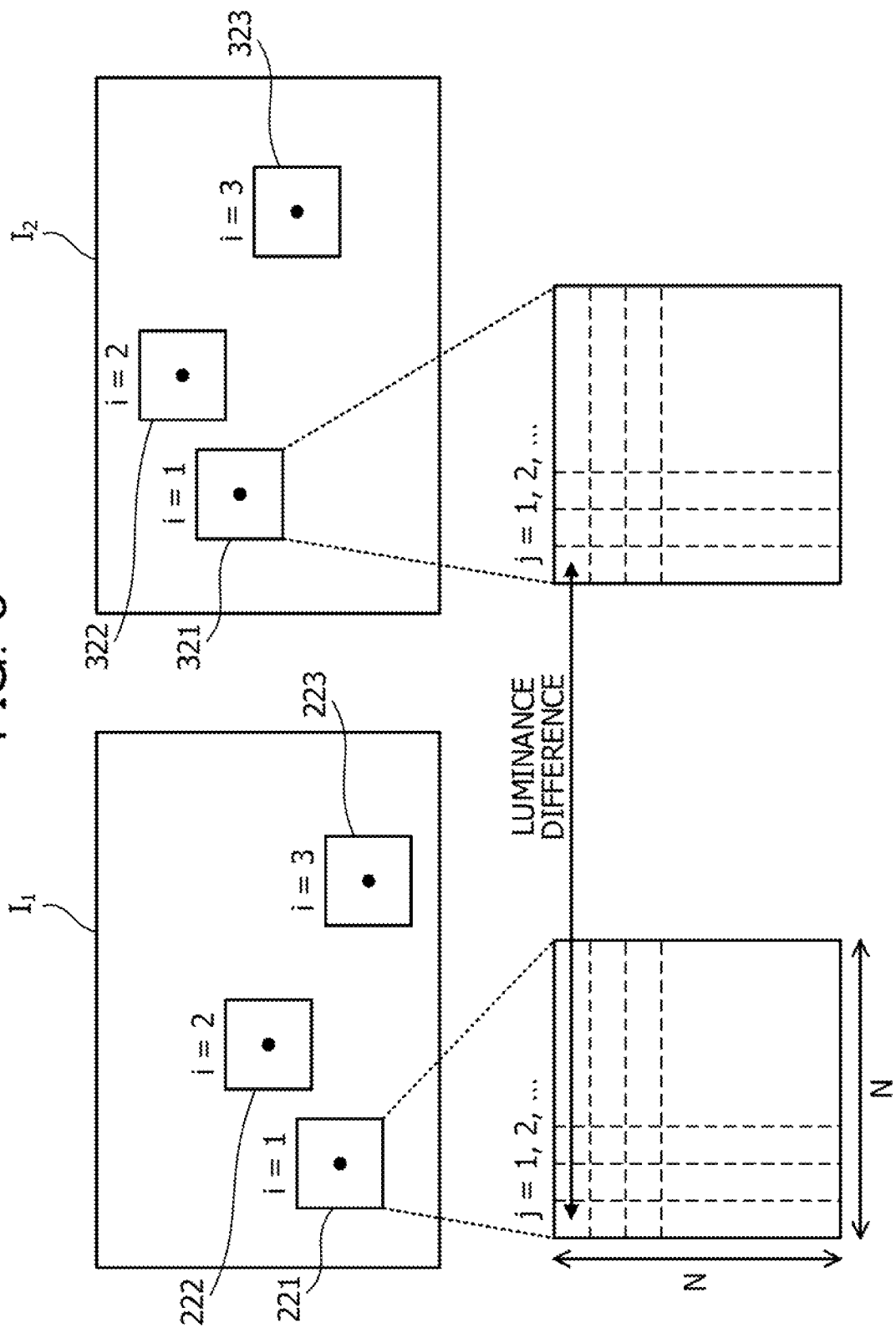
FIG. 9 is a second diagram for explaining the processing of calculating a detailed relative position and orientation.

FIG. 9 is a second diagram for explaining the processing of calculating a detailed relative position and orientation. The detailed relative position and orientation calculation unit 125b identifies areas of interest respectively corresponding to map points $p_i$ in the neighborhood key frame The area of interest is identified as a rectangular area of an s by s matrix of pixels centered around a map point. In the example in FIG. 9, areas of interest 221, 222, and 223 respectively corresponding to the map points $p_1$, $P_2$, and $p_3$ are identified.

The detailed relative position and orientation calculation unit 125b also identifies an area of interest corresponding to each movement destination w($p_i$) in the current image $I_2$. An area of interest in the current image $I_2$ is also identified as a rectangular area of an N by N matrix of pixels centered around a point as the movement destination. In the example in FIG. 9, areas of interest 321, 322, and 323 respectively corresponding to movement destinations w($p_1$), w($p_2$), and w($p_3$) are identified.

The detailed relative position and orientation calculation unit 125b calculates the sum of squares of luminance differences S for all combinations of areas of interest in the neighborhood key frame $I_1$ and the corresponding areas of interest in the current image $I_2$. Here, the luminance of the j-th pixel included in an area of interest corresponding to the i-th map point in the neighborhood frame $I_1$ is denoted as $I_1(i,j)$. In addition, the luminance of the j-th pixel included in an area of interest corresponding to the i-th movement destination in the current image $I_2$ is denoted as $I_2(i,j)$. At this point, the sum of squares of luminance differences S is obtained according to the following equation (6).

$$S = \Sigma_i \Sigma_j [I_{2(i,j)} - I_{1(i,j)}]^2 \quad (6)$$

The detailed relative position and orientation calculation unit 125b calculates the relative position and orientation $\xi_r$ with which the sum of squares of luminance differences S is smallest by an iterative calculation using the Gause-Newton method and outputs the calculation result as the detailed relative position and orientation $\xi_{r1}$. According to the above calculations, the pixel values of areas of interest including peripheral pixels of feature points, rather than features of local feature points, are compared between the neighborhood key frame $I_1$ and the current image $I_2$, and thereby the detailed relative position and orientation $\xi_{r1}$ is calculated. Thus, even when multiple similar image patterns appear, the accuracy of calculation of the detailed relative position and orientation $\xi_{r1}$ is less likely to decrease.

Note that a more detailed method of calculating the detailed relative position and orientation $\xi_{r1}$ will be described with reference to FIG. 11.

Finally, the detailed relative position and orientation calculation unit 125b estimates the absolute position and orientation $\xi_n$ for the current image $I_2$ based on the calculated detailed relative position and orientation $\xi_{r1}$ and the absolute position and orientation $\xi_1$ for the neighborhood key frame $I_1$. The absolute position and orientation $\xi_n$ may be calculated from the equation (1) described above. Since, as mentioned above, the accuracy of calculation of the detailed relative position and orientation $\xi_{r1}$ is less likely to decrease, the accuracy of estimation of the absolute position and orientation $\xi_n$ for the current image $I_2$ may be improved.

Flowchart

Next, processing of the tracking processing unit 120 will be described with reference to flowcharts.

Figure 10:
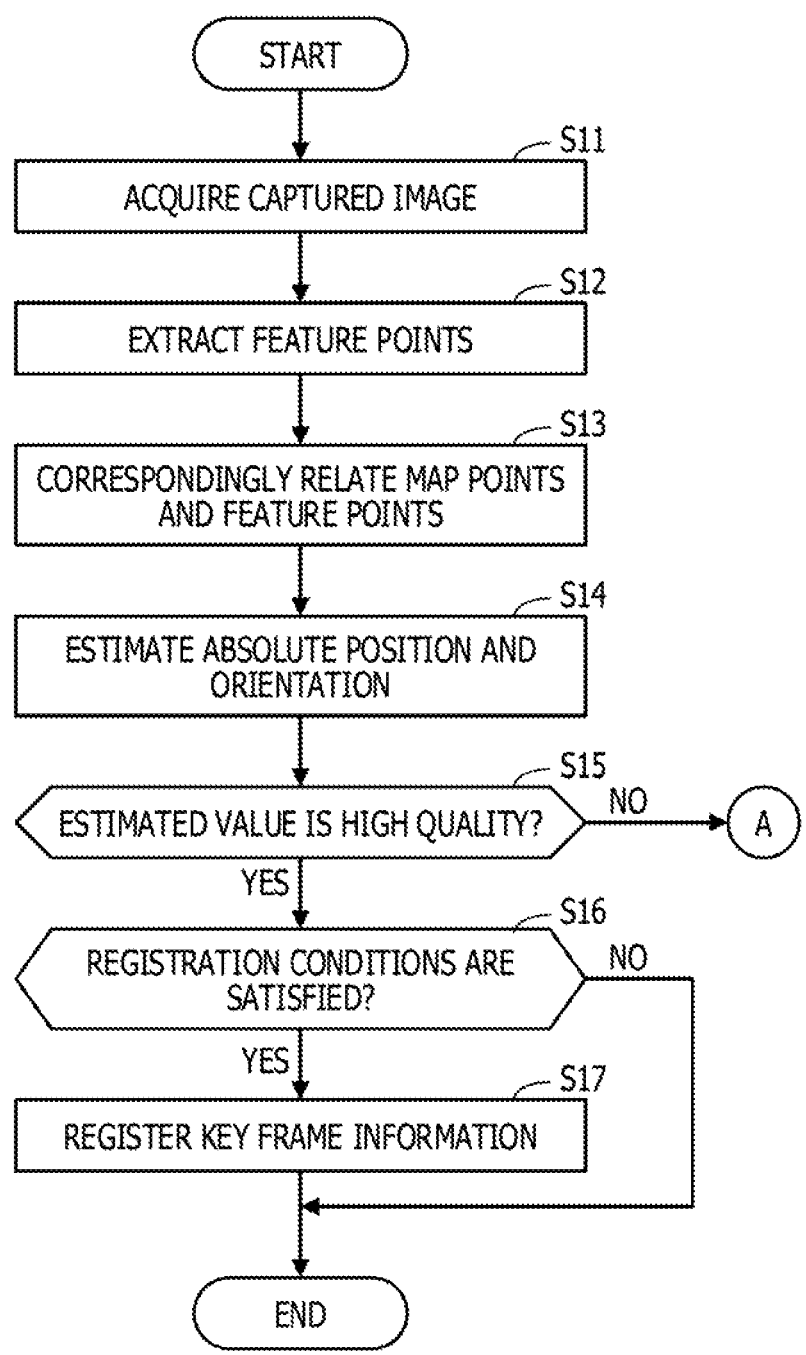
FIG. 10 is a flowchart (1) illustrating an example of a processing procedure of a tracking processing unit.
Figure 11:
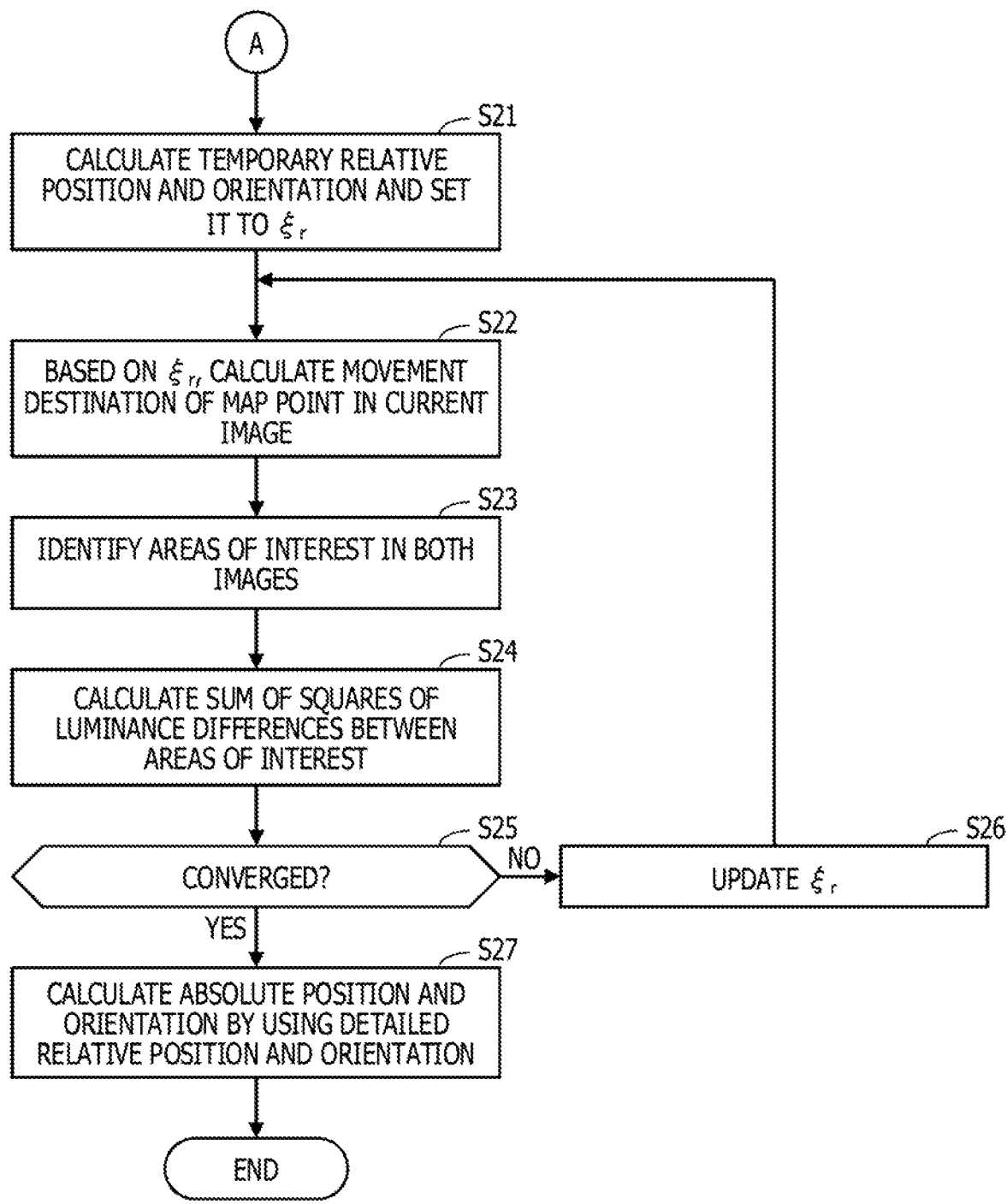
FIG. 11 is a flowchart (2) illustrating the example of the processing procedure of the tracking processing unit.

FIGS. 10 and 11 are flowcharts illustrating an example of the processing procedure of a tracking processing unit.

[Step S11] The image acquisition unit 121 acquires a captured image captured by the camera 108 from the camera 108.

[Step S12] The position and orientation estimation unit 122 extracts feature points from the current image.

[Step S13] The position and orientation estimation unit 122 identifies, as the neighborhood key frame, a key frame resembling the current image out of key frames registered in the key frame information table 112. Then, the position and orientation estimation unit 122 acquires the two-dimensional coordinates of map points (feature points) included in the neighborhood key frame from key frame information on the neighborhood key frame. The position and orientation estimation unit 122 identifies map points in the neighborhood key frame corresponding to the feature points extracted from the current image and extracts a plurality of pairs of feature points and map points.

[Step S14] By using four or more pairs of feature points and map points, the position and orientation estimation unit 122 estimates the absolute position and orientation of the camera 108 at the time of capturing the current image by a PnP algorithm.

[Step S15] The quality determination unit 123 determines the estimation quality of the absolute position and orientation estimated in step S14. If the index value indicating the estimation quality of the absolute position and orientation is greater than or equal to a predetermined threshold, the quality determination unit 123 determines that the estimation quality is high, and executes the processing in step S16. Otherwise, if the index value is less than the threshold, the quality determination unit 123 determines that the estimation quality is low, and executes the processing in step S21 in FIG. 11.

[Step S16] The key frame registration processing unit 124 determines whether registration conditions of key frame information are satisfied. If the registration conditions are satisfied, the key frame registration processing unit 124 determines that the current image is to be registered as a key frame, and executes the processing in step S17. Otherwise, if the registration conditions are not satisfied, the key frame registration processing unit 124 terminates the process.

[Step S17] The key frame registration processing unit 124 registers key frame information for the current image in the key frame information table 112. The absolute position and orientation estimated in step S14 is registered in the item of Position and orientation among the key frame information. In the item of Feature point group, the two-dimensional coordinates of the features of the current image corresponding to map points in the neighborhood key frame in step S13 are registered. In the item of Corresponding map point number, identification numbers of map points corresponding to feature points in the current image.

With reference to FIG. 11, description will be continued below.

[Step S21] The temporary relative position and orientation calculation unit 125a matches the scaled-down image of the current image and the scaled-down image of the neighborhood key frame to calculate the temporary relative position and orientation $\xi_{r0}$ between the current image and the neighborhood key frame. Note that the neighborhood key frame is the key frame identified in step S13 in FIG. 10. The temporary relative position and orientation calculation unit 125a sets the calculated temporary relative position and orientation $\xi_{r0}$ as the initial value of the relative position and orientation $\xi_r$ to be used the subsequent iterative calculation (steps S22 to S25).

[Step S22] The detailed relative position and orientation calculation unit 125b calculates the coordinates w of the movement destination w ($p_i$) in the current image when the position of the map point $p_i$ in the neighborhood key frame moves based on the relative position and orientation $\xi_r$.

[Step S23] The detailed relative position and orientation calculation unit 125b identifies an area of interest corresponding to each of the map points $p_i$ in the neighborhood key frame. The detailed relative position and orientation calculation unit 125b also identifies an area of interest corresponding to each of the movement destinations w ($p_i$) in the current image.

[Step S24] The detailed relative position and orientation calculation unit 125b calculates the sum of squares of luminance differences between areas of interest according to equation (6) described above.

[Step S25] The detailed relative position and orientation calculation unit 125b determines whether the sum of squares of luminance differences S has converged as a result of the iterative calculation. This processing is executed specifically as follows.

As described above, the luminance of the j-th pixel included in an area of interest corresponding to the i-th map point of the neighborhood key frame $I_1$ is denoted as $I_{1(i,j)}$. In addition, the luminance of the j-th pixel included in an area of interest corresponding to the i-th movement destination in the current image $I_2$ is denoted as $I_{2(i,j)}$. The detailed relative position and orientation calculation unit 125b sets a cost function $E(\xi_r)$ as given by equation (7). In addition, $e(\xi_r)$ in equation (7) is expressed as given by equation (8).

$$e(\xi)=1/2|e(\xi)|^2 \qquad (7)$$

$$e(\xi)=S=\Sigma_i\Sigma_j\{I_{2(i,j)}-I_{1(i,j)}\}^2 \qquad (8)$$

The detailed relative position and orientation calculation unit 125b performs calculations of equation (9) and equation (10) when the relative position and orientation is $\xi_r$.

$$A=J^T J \qquad (9)$$

$$a = -J^T e \quad (10)$$

Here, J is a Jacobian matrix of $e(\xi_r)$ and is expressed as given by equation (11) below. In addition, e in equation (11) is expressed as given by equation (12). Note that A in equation (8) is a quadratic approximation of a Hessian matrix by using a Jacobian matrix.

$$J = \frac{de}{d\xi_r}\bigg|_{\xi_r} \quad (11)$$

$$e = e(\xi_r) \quad (12)$$

By using equations (9) and (10), $\delta\xi_r$ that minimizes the cost function $E(\xi_r)$ is represented as in equation (13).

$$A \cdot \delta\xi_r = a \quad (13)$$

The detailed relative position and orientation calculation unit 125b calculates $\delta\xi_r$ by solving equation (13). The detailed relative position and orientation calculation unit 125b calculates $\delta E$ according to equation (14).

$$\delta E = E(\xi_r + \delta\xi_r) - E(\xi_r) \quad (14)$$

The detailed relative position and orientation extraction unit 125b uses an amount of change $|\delta E|/E$ in steps S22 to S24 as an index value for determining the convergence. Alternatively, an amount of change $|\delta\xi_r|/\xi_r$ may be used as the index value. If the index value is sufficiently small, the detailed relative position and orientation calculation unit 125b determines that the sum of squares of luminance differences S has converged. In this case, the detailed relative position and orientation calculation unit 125b outputs $\xi_r$ at this point as the detailed relative position and orientation $\xi_{r1}$ and executes the processing in step S27.

Otherwise, if the index value may not be sufficiently small, the detailed relative position and orientation calculation unit 125b executes the processing in step S26.

[Step S26] The detailed relative position and orientation calculation unit 125b updates $\xi_r$ by $\xi_r + \delta\xi_r$. Thereafter, the process returns to step S22, where processing using the updated $\xi_r$ is executed.

[Step S27] Based on the calculated detailed relative position and orientation $\xi_{r1}$ and the absolute position and orientation $\xi_1$ for the neighborhood key frame acquired from the key frame information table 112, the detailed relative position and orientation calculation unit 125b estimates the absolute position and orientation $\xi_n$ for the current image according to equation (1).

According to the terminal apparatus 100 described above, by comparing the pixel values of areas of interest including peripheries of feature points, rather than the features of feature points, between the neighborhood key frame and the current image, a detailed relative position and orientation is calculated, based on which an absolute position and orientation is estimated. Thereby, compared with the first comparative example described above, even when multiple similar image patterns appear, the accuracy of calculation of the detailed relative position and orientation $_{r1}$ is less likely to decrease. As a result, the accuracy of absolute position and orientation estimation may be improved. Accordingly, return processing may be performed with high accuracy.

In addition, according to the terminal apparatus 100, after the temporary relative position and orientation, which is a rough calculated value, has been calculated by using scaled-down images of the neighborhood key frame and the current image, the detailed relative position and orientation is calculated by comparing pixel values of areas of interest as described above. Then, the absolute position and orientation is estimated based on the detailed relative position and orientation. Therefore, compared with the second comparative example described above, the accuracy of relative position and orientation estimation may be improved, and, as a result, the accuracy of absolute position and orientation estimation may also be improved.

Furthermore, according to the terminal apparatus 100, it is unnecessary to perform feature point tracking using an optical flow with which the accuracy of position and orientation estimation is likely to decrease during movement other than translation of the camera 108. In addition, since there is no case where both the optical flow and the feature matching are performed, the processing load may be reduced.

Next, a modification in which part of processing of the terminal apparatus 100 according to the second embodiment will be described. Note that, in a first modification and a second modification described below, the basic configurations of processing functions of terminal apparatuses are the same, and therefore the configurations of processing functions of the terminal apparatuses are described by using the same reference numerals as in the second embodiment.

First Modification

Figure 12:
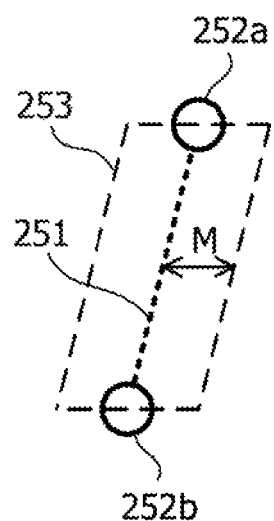
FIG. 12 is a diagram for explaining a method for identifying an area of interest in a first modification.

FIG. 12 is a diagram for explaining a method for identifying an area of interest in the first modification. In the second embodiment, as illustrated in FIG. 9, the area of an N by N matrix of pixels around a map point in the neighborhood key frame or a feature point in the current image is set as an area of interest, as illustrated in FIG. 9. In contrast, in the first modification, a pair of map points 252a and 252b present on an edge 251 is extracted from among map points in the neighborhood key frame. Then, an area of interest 253 is set such that the area relative to a direction of one (the X-axis direction in FIG. 12) of the X-axis and the Y-axis is an area containing the pair of map points 252a and 252b. Additionally, the area relative to the other direction (the Y-axis direction in FIG. 12) is set such that, along this direction, M pixels are included on either side of the line (an edge 251 in FIG. 12) joining the pair of map points 252a and 252b. In the first modification, a plurality of areas of interest as mentioned above are identified.

In addition, in the current image, the movement destinations of the pair of map points as described above based on the temporary relative position and orientation are identified. An area of interest is identified by making use of a straight line joining the pair of movement destinations according to the same rule as is the case in the neighborhood key frame. Note that there is no guarantee that the positional relationship of the pair of map points in the neighborhood key frame is the same as the positional relationship of the pair of movement destinations in the current image. Therefore, there is no guarantee that areas of interest corresponding between a key frame and the current image have the same size or have the same shape.

Since an area of interest is identified based on a result of detection of an edge as mentioned above, the accuracy of estimation of a detailed relative position and orientation in an environment where an object has many linear patterns may be improved compared with the second embodiment.

Note that, in the present modification, rectangular areas of interest around a map point and a feature point used in the second embodiment are also used in addition to an area of interest based on a result of detection of an edge as illustrated in FIG. 12. Feature points are extracted mainly in a corner portion, and therefore, in the second embodiment, the effect of improving the accuracy of detailed relative position and orientation estimation is high in the case where there are many image patterns among which the shape of the vicinity of the corner portion is similar. Accordingly, additional use of the areas of interest used in the second embodiment may improve the accuracy of position and orientation estimation for various environments.

Figure 13:
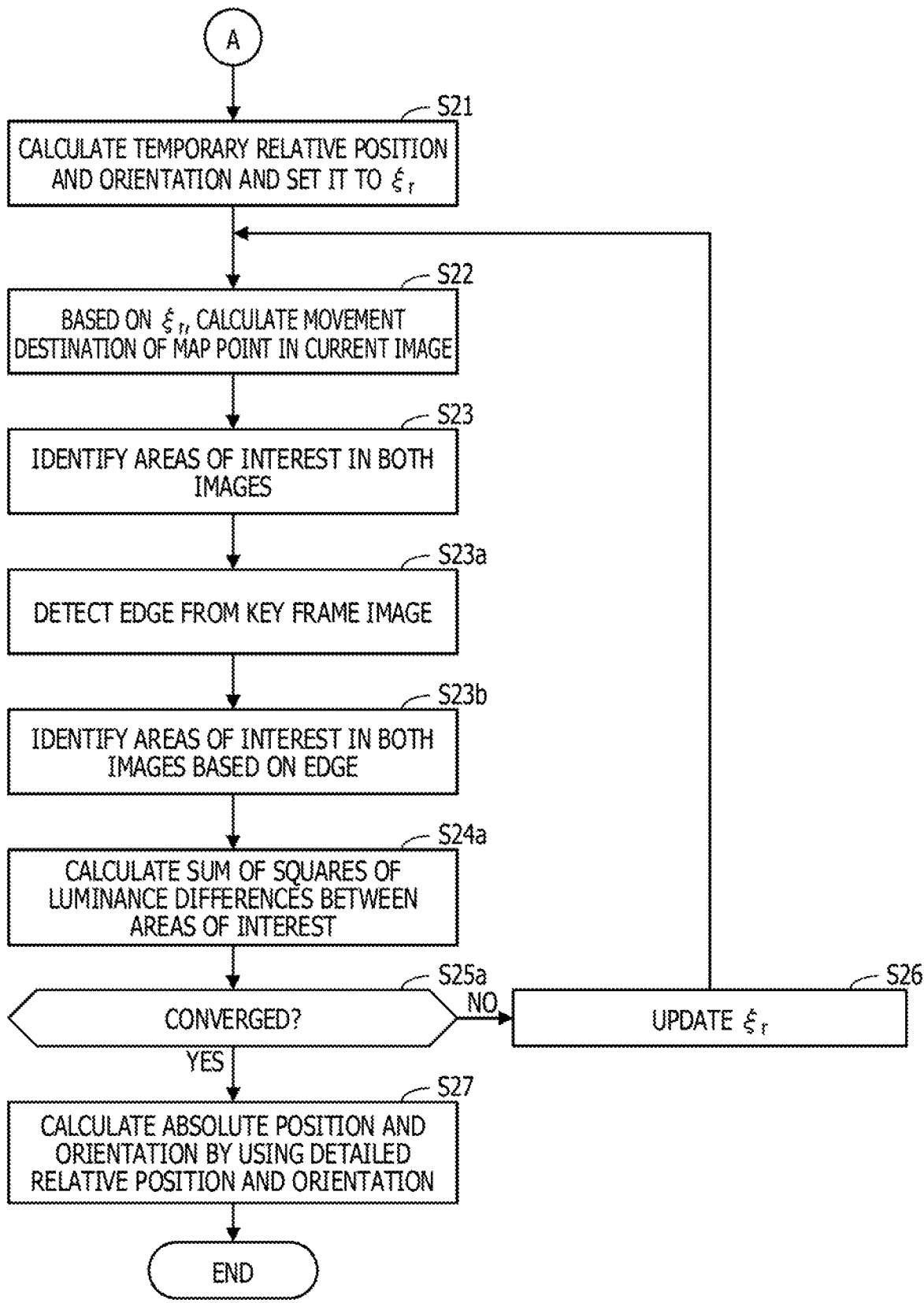
FIG. 13 is a flowchart illustrating an example of a return processing procedure in the first modification.

FIG. 13 is a flowchart illustrating an example of a return processing procedure in the first modification. In the first modification, the same process as in FIG. 11 is modified as illustrated in FIG. 13. Note that, in FIG. 13, process steps in which the same processing as in FIG. 11 is executed are denoted by the same reference numerals and the description thereof is omitted.

In the processing in FIG. 13, steps S23a and S23b are executed subsequently to the step S23 in FIG. 11. Subsequently, steps S24a and S25a are executed in place of steps S24 and S25.

[Step S23a] The detailed relative position and orientation calculation unit 125b detects edges from the neighborhood key frame.

[Step S23b] The detailed relative position and orientation calculation unit 125b identifies pairs of map points present on the same edge out of map points in the neighborhood key frame. The detailed relative position and orientation calculation unit 125b then identifies an area of interest corresponding to each identified pair of map points in the neighborhood key frame. Further, the detailed relative position and orientation calculation unit 125b identifies pairs of movement destinations in the current image corresponding to the identified pairs of map points and identifies an area of interest corresponding to each pair of movement destinations in the current image.

[Step S24a] The detailed relative position and orientation calculation unit 125b calculates the sum of squares of luminance differences S between the area of interest in the neighborhood key frame and the area of interest in the current image.

Here, the area of interest identified in step S23 is called "first area of interest" and the area of interest identified in step S23b is called "second area of interest". In addition, the luminance of a j-th pixel included in the first area of interest corresponding to the i-th map point in the neighborhood key frame $I_1$ is denoted as $I_{1(i,j)}$, and the luminance of the j-th pixel included in the first area of interest corresponding to the i-th movement destination in the current image $I_2$ is denoted as $I_{2(i,j)}$. Further, the luminance of an n-th pixel included in the second area of interest corresponding to an m-th map point pair in the neighborhood key frame $I_1$ is denoted as $I_{1(m,n)}$, and the luminance of an n-th pixel included in the second area of interest corresponding to an m-th movement destination pair in the current image $I_2$ is denoted as $I_{2(m,n)}$. At this point, the detailed relative position and orientation calculation unit 125b calculates the sum of squares of luminance differences S according to the following equation (15).

$$S=\Sigma_i\Sigma_j[I_{2(i,j)}-I_{1(i,j)}]^2+\Sigma_m\Sigma_n[I_{2(m,n)}-I_{1(m,n)}]^2 \quad (15)$$

[Step S25a] The detailed relative position and orientation calculation unit 125b applies the sum of squares of luminance differences S calculated in step S24a and, in a procedure similar to that in step S25 in FIG. 11, determines whether convergence has been achieved.

Second Modification

Figure 14:
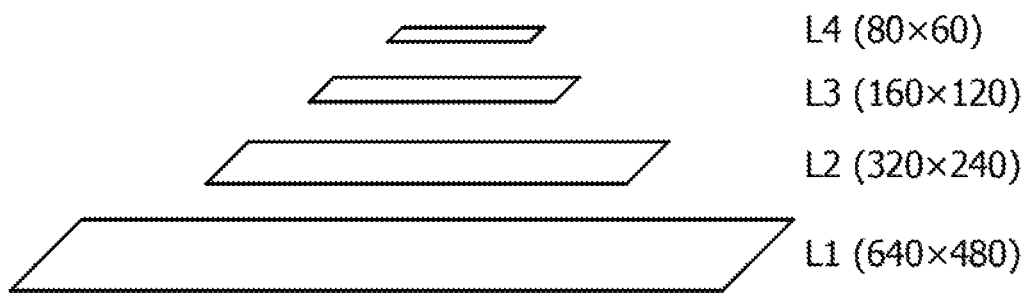
FIG. 14 is a diagram illustrating an example of a configuration of an image pyramid.

FIG. 14 is a diagram illustrating an example of a configuration of an image pyramid. The image pyramid illustrated in FIG. 14 includes a hierarchical level L1 corresponding to the original image and hierarchical levels L2 to L4 of scaled-down images obtained by scaling down the original image. The image of the hierarchical level L2 is half the size of the image of the hierarchical level L1, the image of the hierarchical level L3 is half the size of the image of the hierarchical level L2, and the image of hierarchical level L4 is half the size of the image of the hierarchical level L3. Note that, here, the hierarchical level L4 is assumed to be the highest level and the hierarchical level L1 is assumed to be the lowest level.

In the second modification, images of hierarchical levels L1 to L4 as illustrated in FIG. 14 are used for each of the neighborhood key frame and the current image. For example, the images of hierarchical levels L1 to L4 corresponding to the neighborhood key frame may be registered in advance for the corresponding key frame information. In contrast, the images of hierarchical levels L1 to L4 corresponding to the current image are generated at the time of return processing.

In the second modification, the detailed relative position and orientation calculation unit 125b performs iteration processing for calculating the detailed relative position and orientation while sequentially making use of images of the hierarchical level L4 to the hierarchical level L1 corresponding to the neighborhood key frame and the current image. Details of the processing will be described with reference to FIG. 15.

Figure 15:
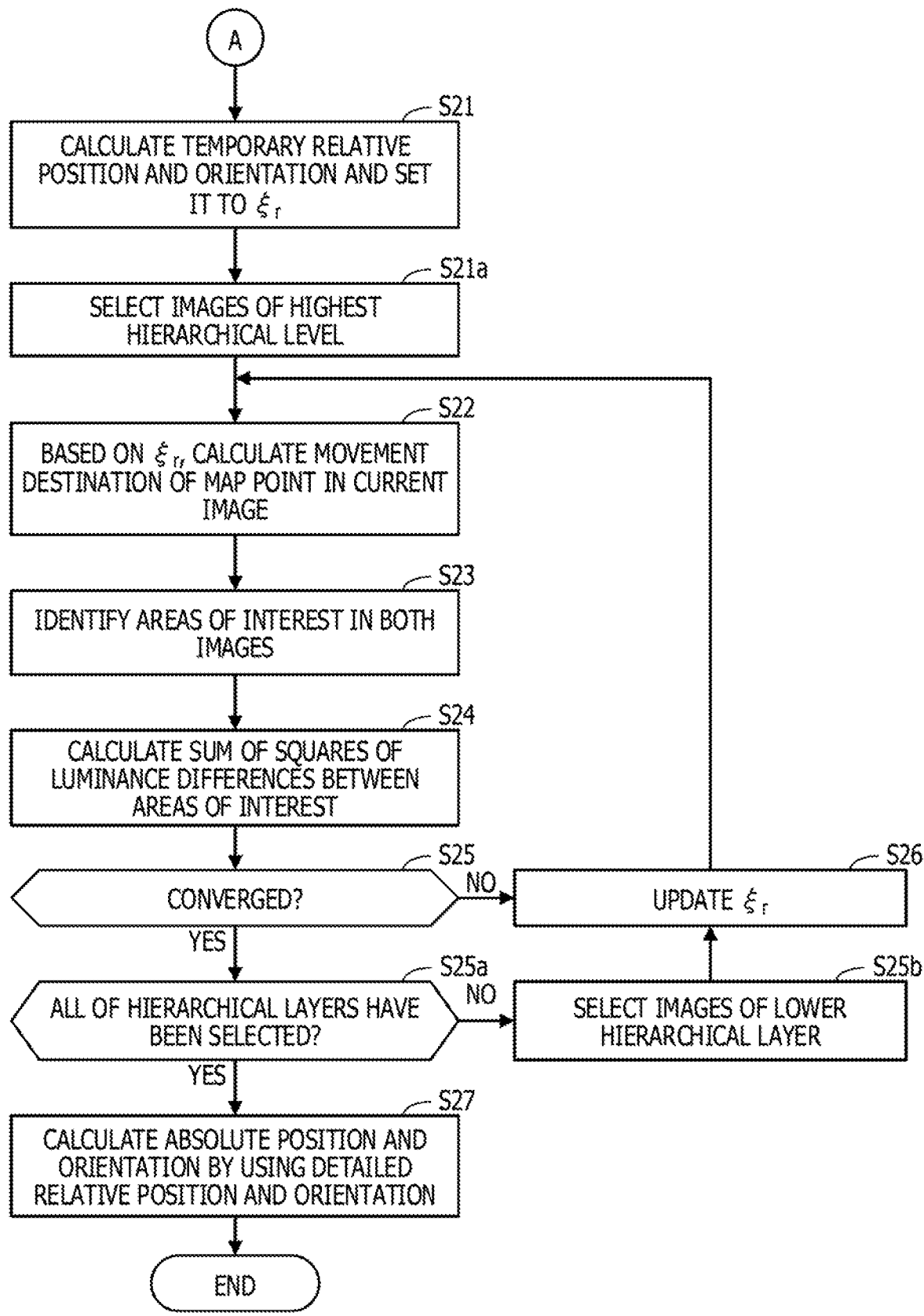
FIG. 15 is a flowchart illustrating an example of a return processing procedure in a second modification.

FIG. 15 is a flowchart illustrating an example of a return processing procedure in the second modification. In the second modification, the process illustrated in FIG. 11 is modified as illustrated in FIG. 15. Note that, in FIG. 15, the processing steps in which the same processing as in FIG. 11 is executed are denoted by the same reference numerals and description thereof is omitted.

In the process in FIG. 15, subsequent to step S21 in FIG. 11, step S21a is executed, and thereafter step S22 is executed. In addition, steps S25a and S25b are added.

[Step 21a] The detailed relative position and orientation calculation unit 125b selects images of the highest hierarchical layer (hierarchical layer L4) as the neighborhood key frame and the current image used for the processing in step S22 and the subsequent steps.

[Step S25a] If the determination is "Yes" in step S25, the detailed relative position and orientation calculation unit 125b executes the processing in step S25a. The detailed relative position and orientation calculation unit 125b determines whether all of the hierarchical layers of the image pyramid have been selected. If there is a hierarchical layer that has not yet been selected, the detailed relative position and orientation calculation unit 125b executes the processing in step 525b; if all of the hierarchical layers have been selected, the detailed relative position and orientation calculation unit 125b executes the processing in step S27.

[Step S25b] The detailed relative position and orientation calculation unit 125b selects images of an hierarchical layer one layer lower than the current hierarchical layer as the neighborhood key frame and the current image used for the next processing in step S22 and the subsequent steps. After this, the detailed relative position and orientation calculation unit 125b executes the processing in step S26.

According to the second modification described above, convergence may be made faster in the process of calculating a detailed relative position and orientation. For example, in the case where image pyramid is not used, speedup of the motion of the camera 108 increases the possibility that convergence will end up failure or there will be convergence to a false numerical value. In contrast, making use of images sequentially from the highest layer of an image pyramid makes it possible to perform calculation while narrowing down the convergence range of the relative position and orientation gradually, level by level. This allows estimation processing to proceed while keeping convergence to a suitable value at any time, facilitating convergence to a correct value. In addition, facilitating convergence to a correct value may reduce the time taken for convergence.

Note that, in the second modification described above, an example where only the areas of interest centered around map points and feature points, which are used in the second embodiment, are used as areas of interest is illustrated. However, even when an image pyramid is used as in the second modification, for example, areas of interest based on a result of detection of edges may be used, or areas of interest centered around map points and feature points and areas of interest based on a result of detection of edges may be used together.

In addition, the processing functions of apparatuses (the camera position and orientation estimation apparatus 1 and the terminal apparatus 100) described in the foregoing embodiments may be implemented by a computer. In this case, providing programs in which the processing details of functions to be included in each apparatus are described and executing the programs on a computer allows the processing functions in the foregoing to be implemented on the computer. The programs in which the processing details are described may be recorded on a computer-readable recording medium. Examples of the computer-readable recording medium include a magnetic storage device, an optical disk, a magneto-optical recording medium, and a semiconductor memory. Examples of the magnetic storage device include a hard disk device (HDD), a flexible disk (FD), and a magnetic tape. Examples of the optical disk include a digital versatile disc (DVD), DVD-RAM, compact disc-read only memory (CD-ROM), and a CD-recordable (R)/rewritable (RW). Examples of the magneto-optical recording medium include a magneto-optical disk (MO).

When a program is distributed, for example, a portable recording medium, such as a DVD or a CD-ROM, on which the program is recorded is sold. Additionally, a program is stored in a storage device of a server computer, and the program may be transferred via a network from the server computer to another computer.

A computer that executes a program stores, in a storage device thereof, a program recorded on a portable recording medium or a program transferred from a server computer. The computer then reads a program from the storage device thereof and executes processing in accordance with the program. Note that the computer may read a program directly from a portable recording medium and execute processing in accordance with the program. Additionally, each time a program is transferred from a server computer coupled via a network, the computer may sequentially execute processing in accordance with the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory configured to:
      store a plurality of images captured by an imaging device,
      store first position information indicating positions of the imaging device in capturing of each of the plurality of images, and
      store first orientation information indicating orientations of the imaging device in capturing of each of the plurality of images; and
   a processor coupled to the memory and configured to:
      identify, among from the plurality of images, a first image resembling a second image captured by the imaging device,
      identify a first area included in the first image,
      identify a second area, included in the second image, corresponding to the first area,
      identify second position information and second orientation information indicating a position and an orientation of the imaging device respectively in capturing of the second image, based on a comparison between a first luminance of a first pixel included in the first area and a second luminance of a second pixel included in the second area and the first position information and the first orientation information of the first image, and
      output the identified second position information and the second orientation information.

2. The information processing apparatus according to claim 1, wherein the processor is configured to:
   identify the second area based on relative position value and relative orientation value indicating a relative position and orientation of the imaging device respectively in capturing of the second image with respect to the position and the orientation of the imaging device indicated by the first position information and the first orientation information respectively.

3. The information processing apparatus according to claim 2, wherein the processor is configured to:
   identify the relative orientation value so that a difference between the first luminance and the second luminance is smallest, and
   identify the second position information and the second orientation information based on the relative orientation value, the first position information, and the first orientation information.

4. The information processing apparatus according to claim 3, wherein the processor is configured to:
   identify an initial value of the relative position value and an initial value of the relative orientation value based on a first scaled-down image obtained by scaling down the first image and a second scaled-down image obtained by scaling down the second image,
   calculate, by performing an iterative calculation, the relative position value and the relative orientation value so that the difference between the first luminance and the second luminance is smallest when the second area is estimated based on the initial value of the relative position value and the initial value of the relative orientation value, and
   identify the second position information and the second orientation information, based on the relative position value and the relative orientation value calculated by performing the iterative calculation and the first position information and the first orientation information.

5. The information processing apparatus according to claim 4, wherein the processor is configured to:
perform the iterative calculation by using, in ascending order of size, the first image and the second image and a plurality of pairs of images having different sizes obtained by transforming the first image and the second image,
wherein the relative position value and the relative orientation value calculated by performing the iterative calculation using a first pair of images out of the plurality of pairs of images are set as the initial values of the relative position value and the relative orientation value in the iterative calculation using a second pair of images that is larger in size than the first pair of images and is next to the first pair of images in the ascending order of size.

6. The information processing apparatus according to claim 1, wherein the memory is configured to:
store the first image including a plurality of feature points,
wherein the first area is identified as an area including three or more pixels including, among the plurality of feature points, a pair of feature points joined by an edge on the first image.

7. The information processing apparatus according to claim 1, wherein the memory is configured to:
store a plurality of map point coordinates representing coordinates on three-dimensional space for a plurality of features, respectively, and the processor is configured to:
based on, among the plurality of map point coordinates, first map point coordinates for a first feature point included in a third image, identify third position information and third orientation information indicating a position and orientation of the imaging device respectively in capturing of the third image,
wherein identification of the first area and identification of the second area are performed when the third position information and the third orientation information are not identified, and
wherein the second image is an image captured by the imaging device when the third position information and the third orientation information are not identified.

8. A method executed by an information processing apparatus, the method comprising:
storing a plurality of images captured by an imaging device;
storing first position information indicating positions of the imaging device in capturing of each of the plurality of images;
storing first orientation information indicating orientations of the imaging device in capturing of each of the plurality of images;
identifying, among from the plurality of images, a first image resembling a second image captured by the imaging device;
identifying a first area included in the first image;
identifying a second area, included in the second image, corresponding to the first area;
identifying second position information and second orientation information indicating a position and an orientation of the imaging device respectively in capturing of the second image, based on a comparison between a first luminance of a first pixel included in the first area and a second luminance of a second pixel included in the second area and the first position information and the first orientation information of the first image; and
outputting the identified second position information and the second orientation information.

9. The method according to claim 8 further comprising:
identifying the second area based on relative position value and relative orientation value indicating a relative position and orientation of the imaging device respectively in capturing of the second image with respect to the position and the orientation of the imaging device indicated by the first position information and the first orientation information respectively.

10. The method according to claim 9 further comprising:
identifying the relative orientation value so that a difference between the first luminance and the second luminance is smallest; and
identifying the second position information and the second orientation information based on the relative orientation value, the first position information, and the first orientation information.

11. The method according to claim 10 further comprising:
identifying an initial value of the relative position value and an initial value of the relative orientation value based on a first scaled-down image obtained by scaling down the first image and a second scaled-down image obtained by scaling down the second image;
calculating, by performing an iterative calculation, the relative position value and the relative orientation value so that the difference between the first luminance and the second luminance is smallest when the second area is estimated based on the initial value of the relative position value and the initial value of the relative orientation value; and
identifying the second position information and the second orientation information, based on the relative position value and the relative orientation value calculated by performing the iterative calculation and the first position information and the first orientation information.

12. The method according to claim 11 further comprising:
performing the iterative calculation by using, in ascending order of size, the first image and the second image and a plurality of pairs of images having different sizes obtained by transforming the first image and the second image,
wherein the relative position value and the relative orientation value calculated by performing the iterative calculation using a first pair of images out of the plurality of pairs of images are set as the initial values of the relative position value and the relative orientation value in the iterative calculation using a second pair of images that is larger in size than the first pair of images and is next to the first pair of images in the ascending order of size.

13. The method according to claim 8 further comprising:
storing the first image including a plurality of feature points,
wherein the first area is identified as an area including three or more pixels including, among the plurality of feature points, a pair of feature points joined by an edge on the first image.

14. The method according to claim 8 further comprising:
storing a plurality of map point coordinates representing coordinates on three-dimensional space for a plurality of features, respectively; and
based on, among the plurality of map point coordinates, first map point coordinates for a first feature point included in a third image, identifying third position information and third orientation information indicating a position and orientation of the imaging device respectively in capturing of the third image, wherein identification of the first area and identification of the second area are performed when the third position information and the third orientation information are not identified, and wherein the second image is an image captured by the imaging device when the third position information and the third orientation information are not identified.

15. A non-transitory computer-readable storage medium storing a program that causes an information processing apparatus to execute a process, the process comprising:

storing a plurality of images captured by an imaging device;

storing first position information indicating positions of the imaging device in capturing of each of the plurality of images;

storing first orientation information indicating orientations of the imaging device in capturing of each of the plurality of images;

identifying, among from the plurality of images, a first image resembling a second image captured by the imaging device;

identifying a first area included in the first image;

identifying a second area, included in the second image, corresponding to the first area;

identifying second position information and second orientation information indicating a position and an orientation of the imaging device respectively in capturing of the second image, based on a comparison between a first luminance of a first pixel included in the first area and a second luminance of a second pixel included in the second area and the first position information and the first orientation information of the first image; and outputting the identified second position information and the second orientation information.

16. The non-transitory computer-readable storage medium according to claim 15, the process further comprising:

identifying the second area based on relative position value and relative orientation value indicating a relative position and orientation of the imaging device respectively in capturing of the second image with respect to the position and the orientation of the imaging device indicated by the first position information and the first orientation information respectively.

17. The non-transitory computer-readable storage medium according to claim 16, the process further comprising:

identifying the relative orientation value so that a difference between the first luminance and the second luminance is smallest; and identifying the second position information and the second orientation information based on the relative orientation value, the first position information, and the first orientation information.

18. The non-transitory computer-readable storage medium according to claim 17, the process further comprising:

identifying an initial value of the relative position value and an initial value of the relative orientation value based on a first scaled-down image obtained by scaling down the first image and a second scaled-down image obtained by scaling down the second image;

calculating, by performing an iterative calculation, the relative position value and the relative orientation value so that the difference between the first luminance and the second luminance is smallest when the second area is estimated based on the initial value of the relative position value and the initial value of the relative orientation value; and identifying the second position information and the second orientation information, based on the relative position value and the relative orientation value calculated by performing the iterative calculation and the first position information and the first orientation information.

19. The non-transitory computer-readable storage medium according to claim 18, the process further comprising:

performing the iterative calculation by using, in ascending order of size, the first image and the second image and a plurality of pairs of images having different sizes obtained by transforming the first image and the second image, wherein the relative position value and the relative orientation value calculated by performing the iterative calculation using a first pair of images out of the plurality of pairs of images are set as the initial values of the relative position value and the relative orientation value in the iterative calculation using a second pair of images that is larger in size than the first pair of images and is next to the first pair of images in the ascending order of size.

20. The non-transitory computer-readable storage medium according to claim 15, the process further comprising:

storing the first image including a plurality of feature points, wherein the first area is identified as an area including three or more pixels including, among the plurality of feature points, a pair of feature points joined by an edge on the first image.

* * * * *